United States Patent
Kuroiwa et al.

(10) Patent No.: US 8,225,627 B2
(45) Date of Patent: Jul. 24, 2012

(54) METHOD FOR REDUCING DIAMETER OF BUBBLE EXISTING IN A GLASS PLATE

(75) Inventors: Yutaka Kuroiwa, Yokohama (JP); Setsuro Ito, Yokohama (JP); Motoichi Iga, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 870 days.

(21) Appl. No.: 11/872,354

(22) Filed: Oct. 15, 2007

(65) Prior Publication Data

US 2008/0037014 A1    Feb. 14, 2008

Related U.S. Application Data

(63) Continuation of application No. PCT/JP2006/307980, filed on Apr. 14, 2006.

(30) Foreign Application Priority Data

Apr. 15, 2005  (JP) ................................. 2005-118193

(51) Int. Cl.
*C03B 23/02*     (2006.01)
*C03B 29/00*     (2006.01)

(52) U.S. Cl. .............................................. 65/28; 65/111

(58) Field of Classification Search .............. 65/28, 102, 65/104, 111, 120
See application file for complete search history.

(56) References Cited

U.S. PATENT DOCUMENTS

| | | | |
|---|---|---|---|
| 3,259,480 A * | 7/1966 | Michalik et al. .................. 65/28 |
| 4,338,114 A * | 7/1982 | Brockway et al. ................ 65/28 |
| 4,562,332 A * | 12/1985 | Walter et al. ............. 219/121.35 |
| 4,727,234 A * | 2/1988 | Oprysko et al. ........... 219/121.6 |
| 4,731,254 A * | 3/1988 | Heineken et al. ............. 427/554 |
| 5,196,041 A * | 3/1993 | Tumminelli et al. ............ 65/386 |
| 5,427,825 A * | 6/1995 | Murnick ........................ 427/555 |
| 5,441,836 A * | 8/1995 | Balz et al. ......................... 430/5 |
| 5,514,850 A * | 5/1996 | Miyazaki et al. ........ 219/121.69 |
| 5,595,583 A * | 1/1997 | Murnick ......................... 65/350 |
| 5,642,198 A * | 6/1997 | Long ............................. 356/430 |
| 5,697,998 A * | 12/1997 | Platus et al. .................... 65/104 |
| 5,736,206 A * | 4/1998 | Englisch et al. ............. 428/34.6 |
| 5,742,026 A * | 4/1998 | Dickinson et al. ....... 219/121.69 |
| 6,705,125 B2 * | 3/2004 | Peterson et al. ................ 65/392 |
| 6,877,341 B1 * | 4/2005 | Hong ............................... 65/28 |
| 7,619,227 B2 * | 11/2009 | Neukirch ................... 250/492.2 |
| 8,109,118 B2 * | 2/2012 | Watanabe et al. ............ 65/134.9 |
| 2002/0046579 A1 * | 4/2002 | Peterson et al. ................ 65/386 |
| 2003/0104920 A1 | 6/2003 | Schwertfeger et al. |
| 2008/0037014 A1 * | 2/2008 | Kuroiwa et al. ........... 356/239.1 |

FOREIGN PATENT DOCUMENTS

| | | |
|---|---|---|
| EP | 0 822 167 A2 | 2/1998 |
| JP | 6-16440 A | 1/1994 |
| JP | 10-239828 | 9/1998 |
| JP | 2003-12346 A | 1/2003 |
| JP | 2004-35333 A | 2/2004 |

* cited by examiner

*Primary Examiner* — Jason L. Lazorcik (74) *Attorney, Agent, or Firm* — Oblon, Spivak, McClelland, Maier & Neustadt, L.L.P.

(57) ABSTRACT

It is an object of the present invention to provide a new method for reducing the diameter of a bubble existing in a glass plate. Specifically, the present invention provides a method for reducing the diameter of a bubble existing in a glass plate, which comprises irradiating the vicinity of the bubble existing in the glass plate with a light beam emitted from a light source, to raise the temperature of the glass in the vicinity of the bubble to at least the melting point of the glass to reduce the maximum diameter of the bubble.

12 Claims, 7 Drawing Sheets

50.00 μm div

METHOD FOR REDUCING DIAMETER OF BUBBLE EXISTING IN A GLASS PLATE

TECHNICAL FIELD

The present invention relates to a method for reducing the diameter of a bubble existing in a glass plate, particularly a glass plate to be used as a glass substrate for a display, particularly as a glass substrate for a flat panel display, or as a photomask. The present invention enables to improve visibility of a glass plate to be used as a glass substrate for a display. Further, the present invention enables to clear a defect of a photomask due to presence of a bubble.

BACKGROUND ART

Presently, glass plates are employed as members for openings in really large number of fields such as glass substrates for displays, particularly for glass substrates for flat panel displays such as liquid crystal displays, plasma displays, organic EL displays or field emission displays, for window glasses of architectures such as houses or buildings, or for window glasses of transportation vehicles such as automobiles, trains, airplanes or ships. These glass plates are formed from a molten glass by using a float method, a fusion method or a downdraw method. Further, the glass plates are obtained by applying a redraw process to glass plates formed by a primary forming.

Bubbles existing in these glass plates are problematic since they prevent visibility. For example, a thin glass plate of 3 mm thick or thinner is employed as a glass substrate for displays, and if a bubble larger than a predetermined size is existing in the thin glass plate, a white defect is formed in a screen of the display, which prevents visibility of the display. Further, a glass plate of 7 mm thick or thinner is employed as a photomask, and if a bubble of at least a predetermined size is existing in the glass plate, the bubble forms a defect of the photomask.

When a low material batch is processed in a melting process to produce a glass, gases such as $CO_2$, $H_2O$, $O_2$ or $SO_2$ are discharged, but a part of these gases remain in the molten glass as bubbles. When the molten glass is formed into a glass plate, the bubbles existing in the molten glass are each extended in a horizontal direction to have an elliptical shape. Such an elliptical bubble has larger maximum diameter than that of a spherical bubble before it is extended into an elliptical shape, and thus, the bubble particularly adversely affects the visibility of the glass plate.

Heretofore, reduction of the amount of bubbles existing in a glass plate, has been attempted by such methods as improvement of the structure of melting bath or a mixing mechanism inside the melting bath, selection of glass composition which prevents generation or growth of bubbles, or addition of small amount of additives for preventing generation or growth of bubbles. However, although it is possible to reduce the amount of bubbles existing in the glass plate by these methods, it has been difficult to make the amount of bubbles infinitely close to zero. Further, there are many objects to be studied in order to achieve improvement of equipment or change of glass composition, and such a study increasing production cost of glass plates. Further, there occurs e.g. an inconvenience that production of glass is prevented when these methods are carried out.

Patent Document 1 discloses a defect-repairing method for photomask glass that is a method of removing a fine defect existing in a photomask glass following by filling the position where the defect was present with a small glass piece and a liquid curable resin. However, in this method, since the position from which a fine defect is removed by e.g. a drill is filled with a small glass piece and a liquid curable resin, its operation is troublesome. For example, in order to fill the position from which a defect is removed by a drill, it is necessary to prepare a small glass piece of a desired size. Further, after the position is filled with a small glass piece and a liquid curable resin, a polishing operation of a photomask surface is required to achieve desired flatness. These problems become particularly significant in a case of repairing a defect existing in the central portion in the thickness direction of a glass thin plate. Further, it is difficult to make optical characteristics of a portion filled with the small glass piece and the liquid curable resin and those of other portions completely the same as each other, whereby there is a possibility that the portion filled with the small glass piece and the liquid curable resin becomes a new defect.

Patent Document 1: JP-A-10-239828

DISCLOSURE OF THE INVENTION

Problems to be Solved by the Invention

The present invention has been proposed to solve the above-mentioned problems, and it is an object of the present invention to provide a new method for reducing the diameter of a bubble existing in a glass plate to be used as a glass substrate for a display, particularly as a glass substrate for a flat panel display, or as a photomask.

Means for Solving the Problems

In order to achieve the above objects, the present invention provides a method for reducing the diameter of a bubble existing in a glass plate, which comprises irradiating the vicinity of the bubble existing in the glass plate with a light beam emitted from a light source, to raise the temperature of the glass in the vicinity of the bubble to at least the melting point of the glass to reduce the maximum diameter of the bubble.

It is preferred that the maximum diameter of the bubble existing in the glass sheet is at most 400 µm after irradiation of the light beam.

It is further preferred that after the irradiation of the light beam, the maximum diameter of bubbles existing in the glass plate is at most 20 µm.

In the method of the present invention, it is preferred that the light beam is a laser beam.

It is preferred that the laser beam has a wavelength of from 0.1 to 11 µm, and the maximum diameter of the light beam on the surface of the glass plate is from 0.02 to 5 mm.

It is preferred that the laser beam is a laser beam selected from the group consisting of a $CO_2$ laser beam, a YAG laser beam, a semiconductor laser beam, a rare earth material-doped fiber laser beam and a $YVO_4$ laser beam.

In the method of the present invention, it is preferred that the irradiation of the light beam is conducted so that when the maximum diameter D of the light beam on the surface of the glass plate is less than 4 mm, the minimum distance S from an interface between the bubble and the glass to the optical axis of the light beam, satisfies that $0 \leq S \leq 2$ mm.

In the method of the present invention, it is preferred that the irradiation of the light beam is conducted so that when the maximum diameter D of the light beam on the surface of the glass plate is less than 4 mm, the minimum distance S from an interface between the bubble and the glass to the optical axis of the light beam, satisfies that $0 \leq S \leq 0.5$ D.

In the method of the present invention, it is preferred that before the irradiation of the light beam, at least 50% of bubbles existing in the glass plate and satisfying the following formula (1) satisfy the following formula (2):

$$d_1 > 400 \mu m \quad (1)$$

$$d_1 \geq 2d_2 \quad (2)$$

wherein $d_1$ and $d_2$ represent the major diameter and the minor diameter respectively of the shape of a bubble existing in the glass plate that is projected in a direction of normal line to the surface of the glass plate.

In the method of the present invention, it is preferred that before the irradiation of the light beam, at least 5% of bubbles existing in the glass plate and satisfying the following formula (3) satisfy the following formula (4):

$$50 \mu m \leq d_1 \leq 400 \mu m \quad (3)$$

$$d_1 \leq 1.5 d_2 \quad (4)$$

wherein $d_1$ and $d_2$ represent the major diameter and the minor diameter respectively of the shape of a bubble existing in the glass plate that is projected in a direction of normal line to the surface of the glass plate.

In the method of the present invention, it is preferred that provided that before the irradiation of the light beam, the number of bubbles existing in the glass plate is $N_A$ and the number of bubbles satisfying the following formula (5) among the bubbles is $N_B$, and after the irradiation of the light beam, the number of bubbles existing in the glass plate is $N_C$ and the number of bubbles satisfying the following formula (5) among the bubbles is $N_D$, these numbers satisfy the following formula (6):

$$d_1 \leq 1.5 d_2 \quad (5)$$

$$N_B/N_A < N_D/N_C \quad (6)$$

wherein $d_1$ and $d_2$ represent the major diameter and the minor diameter respectively of the shape of a bubble existing in the glass plate that is projected in the direction of normal line to the surface of the glass plate.

In the method of present invention, it is possible to make a bubble existing in a glass plate substantially disappear by the irradiation of the light beam.

EFFECTS OF THE INVENTION

According to the method of the present invention, it is possible to reduce the diameter of bubbles existing in a glass plate, particularly a glass plate to be used as a glass substrate for a display, particularly a glass substrate for a flat panel display, or for a photomask, to a degree not preventing visibility of the glass plate.

By employing the method of the present invention, it is possible to obtain a glass substrate for a display in which white defects are reduced and which is excellent in visibility.

Further, by employing the method of the present invention, it is possible to obtain a photomask in which defects due to the presence of bubbles are cleared.

In the method of the present invention, since the diameters of bubbles are reduced by raising the temperature of the glass in the vicinity of the bubbles locally to at least the melting point, the shape of the glass plate itself is not deteriorated. For this reason, possibility of forming new defects in the glass plate by the treatment is reduced.

Further, in the method of the present invention, since the diameter of a bubble is reduced only by locally irradiating the vicinity of the bubble with a light beam emitted from a light source, smaller number of steps are required and the operation is easy as compared with conventional methods.

Further, according to the method of the present invention, it is also possible to make a bubble existing in a glass plate substantially disappear.

EXPLANATION OF NUMERALS

1: Bubble
2: Vicinity of bubble
10: Float glass plate

BEST MODE FOR CARRYING OUT THE INVENTION

From now, the method of the present invention is further described with reference to drawings.

It is an object of the method of the present invention to reduce the diameters of bubbles existing in a glass plate, particularly in a glass substrate for a display (such as a glass substrate for a flat panel display such as a liquid crystal display or a plasma display) or a glass plate of at most 7 mm thick to be used as a photomask.

Figure 1:
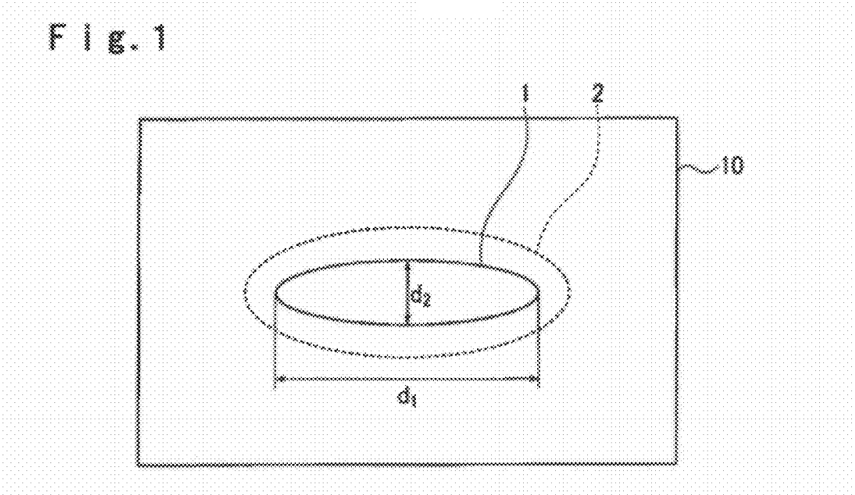
FIG. 1 is a plan view showing a portion of a float glass where a bubble remains.

FIG. 1 is a view schematically showing a bubble existing in a glass plate, which shows the shape of the bubble projected in a direction of normal line to a surface of the glass plate. As evident from FIG. 1, a bubble 1 existing in a glass plate 10 is extended in a horizontal direction when the glass plate 10 is formed, to have an elliptical shape (accurately an elliptical body shape). For example, in the glass plate 10 formed by a float method, the relation between the major diameter $d_1$ and the minor diameter $d_2$ of a bubble 2 becomes as follows:

$$d_1/d_2 = 1.5 \text{ to } 10$$

As evident from this relation, the problem in diameters of bubble 1 present in the glass plate 10, is the maximum diameter of the bubble 1, namely the major diameter $d_1$ of the bubble 1 having an elliptical shape. In this specification, the maximum diameter of bubble 1 means the major diameter $d_1$.

Here, also in a glass plate formed by another method such as a fusion method or a downdraw method, or in a glass plate obtained by applying a redraw process to a glass plate formed by primary forming, bubbles existing in the glass plate become elliptical by being drawn in the horizontal direction at times of forming glass plates, in most cases.

In the method of the present invention, the vicinity 2 of the bubble 1 existing in the glass plate is irradiated with a light beam emitted from a light source. Specifically, provided that the maximum diameter of the light beam on the surface of the glass plate is D and the minimum distance from the interface between the bubble 1 and the glass to the optical axis of the light beam is S, the irradiation of the light beam is preferably carried out so as to satisfy the following relations:

$$0 \leq S \leq 2 \text{ mm (when } D \text{ is less than 4 mm)}$$

$$0 \leq S \leq 0.5D \text{ (when } D \text{ is at least 4 mm)}.$$

Here, in the above equations, the case of S=0 includes a case where the optical axis of the light beam is present in the bubble 1. Namely, in the method of the present invention, "the vicinity 2 of the bubble 1 is irradiated with a light beam" means both "a glass in the vicinity 2 of the bubble 1 is irradiated with a light beam" and "inside of the bubbles 1 is irradiated with a light beam".

By irradiating such an area with a light beam, function of reducing the maximum diameter of the bubble is suitably exhibited. Here, in the method of the present invention, the principle of reducing the maximum diameter of a bubble is described in detail later.

The temperature of a portion of the glass plate 10 irradiated with a light beam is raised by absorbing the light beam. In the method of the present invention, irradiation of the light beam is made so that the temperature of the glass in the vicinity 2 of the bubble 1 becomes at least the softening temperature. The softening temperature is a temperature defined by a measurement method devised by Littleton, which is a temperature at which the viscosity of a glass becomes 7.65 in terms of $\log_{10} \eta$. Accordingly, in the method of the present invention, it is preferred to carry out irradiation of a light beam so that the viscosity of the glass in the vicinity 2 of the bubble 1 becomes at most 7.65 in terms of $\log_{10} \eta$, preferably at most 7, more preferably from 3 to 6.

Here, in the above descriptions, the portion of the glass plate 10 irradiated with a light beam does not necessarily completely agree with the glass in the vicinity 2 of the bubble 1 whose temperature raises at least the softening temperature. Namely, in the method is of the present invention, it is sufficient that by irradiating the position satisfying the above formula with a light beam, the temperature of a glass in the vicinity of the bubble 1, more specifically, the temperature of a glass in the vicinity of its interface with the bubble 1 raises to at least the softening temperature.

In order to reduce the size of the bubble 1, it is preferred that the viscosity of the glass is low since such a glass flows in a shorter time. However, in order to make the viscosity of a glass less than 3 in terms of $\log_{10} \eta$, it is necessary to apply extremely large energy to a glass in the vicinity of its interface with the bubble 1, and such a requirement is not preferred in terms of the construction of equipment to be employed for the method of the present invention. Further, when such a large energy is applied, a glass outside the vicinity of the interface with the bubble 1 is excessively heated, which may cause unnecessary deformation or residual stress in the glass plate 10.

In the method of the present invention, by irradiating the vicinity 2 of the bubble 1 with a light beam so as to satisfy the above-mentioned conditions, the maximum diameter of the bubble 1 can be reduced to at most a desired size, preferably at most 400 μm. As a principle of reducing the maximum diameter of the bubble 1, the following three principles are considered.

As a first principle, when the temperature of a glass in the vicinity of bubble 1, more specifically, the temperature of a glass in the vicinity of its interface with the bubble 1 is increased to at least the softening temperature, the glass in the vicinity of its interface with the bubble 1 becomes flowable. At this time, the shape of the bubble 1 changes from an elliptical shape to a spherical shape so that the pressure in the interface of the bubble 1 existing in the glass plate 10 becomes uniform. When the shape of the bubble 1 changes to a spherical shape, the maximum diameter of the bubble 1 is reduced from that at the time of elliptical shape.

The bubble 1 existing in the glass plate 10 is elongated in the horizontal direction at a time of forming the glass plate 10, to be an elliptical shape. For example, in a case of a glass plate 10 formed by a floating method, the ratio ($d_1/d_2$) between a major diameter $d_1$ and a minor diameter $d_2$ is about from 1.5 to 10. The ratio ($d_1/d_2$) tends to be high as the major diameter $d_1$ of the bubble 1 increases. In a case of bubble 1 having a major diameter $d_1$ is about 50 μm, $d_1/d_2$ is at least 1.5, while in a case of bubble 1 whose major diameter $d_1$ exceeds 400 μm, $d_1/d_2$ is more than 2 in most cases.

According to the method of the present invention, by changing the shape of the bubble 1 from an elliptical shape to a spherical shape, it is possible to make the ratio ($d_1/d_2$) to at most 1.5, preferably at most 1.2, more preferably about 1. Accordingly, it is possible to reduce the maximum diameter of the bubble 1. In a case of a bubble having a maximum diameter $d_1$=500 μm and a ratio $d_1/d_2$=3.5, by changing the shape of the bubble from an elliptical shape to a spherical shape, it is possible to reduce the maximum diameter of the bubble so that the maximum diameter is $d_1$=250 μm and the ratio is $d_1/d_2$=about 1.1.

As a second principle, when the bubble 1 exists in the vicinity of a surface of the glass plate 10, the temperature of a glass in a region of from the vicinity 2 of the bubble 1 to the surface of the glass plate 10 rises to at least the softening temperature, and the glass in this region becomes flowable. Accordingly, the bubble 1 floats up to the surface of the glass plate 10. The bubble 1 reached the surface of the glass plate 10 breaks up and disappears. Namely, according to this principle, the bubble 1 in the vicinity of a surface of the glass plate 10 substantially disappears, and thus, the maximum diameter of the bubble 1 in the glass plate becomes zero.

As a third principle, the temperature of a glass in the vicinity 2 of the bubble 1, more specifically, the temperature of a glass in the vicinity of its interface with the bubble 1 rises to at least the softening temperature, and the glass in the vicinity of its interface with the bubble 1 expands. By the expansion of the glass in the vicinity of its interface with the bubble 1, the bubble 1 is squashed to reduce the volume of the bubble 1. Accordingly, the maximum diameter of the bubble 1 is reduced. When the temperature of a glass in the vicinity 2 of the bubble 1 rises, the bubble 1 also tries to expand, but the expansive power of the bubble 1 being a gas is far lower than the expansive power of the glass. As a result, the volume of the bubble 1 is reduced by the expansion of the glass in the vicinity 2 of the bubble, and the maximum diameter of the bubble 1 is reduced.

According to the method of the present invention, according to any one of the three principles or a combination of these principles, it is possible to reduce the maximum diameter of the bubble 1 existing in the glass plate 10 to at most a predetermined size. The maximum diameter of the bubble 1 is preferably reduced to at most 400 μm, more preferably at most 250 μm, still more preferably reduced to at most 100 μm. In a case of a glass plate 10 to be used as a photomask, the maximum diameter of the bubble 1 present in the glass plate is preferably reduced to at most 50 μm, more preferably at most 20 μm.

In the above, the method of the present invention has been explained with respect to a single bubble 1 existing in a glass plate 10. However, usually a plurality of bubbles are existing in the glass plate 10. The method of the present invention can reduce the maximum diameters of these plurality of bubbles 1 existing in the glass plate 10.

As described above, bubbles 1 ($d_1 > 400$ μm) of a glass plate 10 formed by a float method, $d_1/d_2$ is at least 2 in most cases. Specifically, the ratio $N_Y/N_X$ of the number $N_Y$ of bubbles satisfying the following formula (2) among the number $N_X$ of bubbles existing in the glass plate and satisfying $d_1 > 400$ μm, is at least 50%. Further, the ratio $N_X/N_Z$ of the number $N_X$ of bubbles satisfying $d_1 > 400$ μm based on the number $N_Z$ of bubbles satisfying 50 μm $\leq d_1 \leq 400$ μm and $d_1 > 1.5\, d_2$, satisfies $N_X/N_Z \geq 10\%$ in most cases.

$$d_1 \geq 2d_2 \quad (2)$$

According to the method of the present invention, it is possible to reduce the maximum diameters of bubbles 1 existing in a glass plate 10, so that the ratio ($d_1/d_2$) becomes at most 1.5. Namely, provided that the number of bubbles 1 existing in the glass plate 10 and satisfying 50 μm $\leq d_1 \leq 400$ μm after carrying out the present invention is a denominator, and that the number of bubbles satisfying the above formula (2) before carrying out the present invention and satisfying the following formula (4) after carrying out the present invention is a numerator, the ratio is represented by a formula $N_Y/(N_Z+N_Y)$, and its value is at least 5%.

$$d_1 \leq 1.5 d_2 \quad (4)$$

Accordingly, between before and after carrying out the method of the present invention, the bubbles 1 existing in the glass plate 10 satisfy the following formula (6).

$$N_B/N_A < N_D/N_C \quad (6)$$

$N_A$: Number of bubbles existing in a glass plate before irradiation of light beam $N_B$: Number of bubbles satisfying the above formula (4) among the above bubbles $N_C$: Number of bubbles existing in the glass plate after irradiation of a light beam $N_D$: Number of bubbles satisfying the above formula (4) among the above bubbles A light beam to be used in the method of the present invention, is not particularly limited so long as it can raise the temperature of a glass in the vicinity 2 of a bubble 1 irradiated with the light beam to at least the softening point. Accordingly, a high-intensity lamp may be employed, which produces a light beam in a wavelength region that is absorbed in the glass plate 10. However, a laser light source is preferred since it can selectively emit a specific wavelength, and it is suitable for local irradiation with high energy density.

The laser light source may be at least one selected from the group consisting of a $CO_2$ laser beam, a YAG laser beam, a semiconductor beam, a rare earth material-doped fiber laser beam and a $YVO_4$ laser beam. These laser beams may be used alone, or a plurality of laser beams may be used in combination. Here, a $CO_2$ laser, a YAG laser or a $YVO_4$ laser is preferred since they are commonly widely used and they can produce high-intensity light source.

A $CO_2$ laser is the most typically a light beam of emission wavelength 10.6 μm. When the glass plate 10 is irradiated with a light beam of this wavelength region, the light beam is almost completely absorbed in the glass plate 10 to raise the temperature of a portion irradiated with the light beam. Accordingly, in a case of using a $CO_2$ laser light source, it is sufficient that e.g. a lens is employed to condense a light beam in the vicinity 2 of a bubble 1.

Meanwhile, in cases of YAG laser and $YVO_4$ laser, besides a light beam of 1,064 nm being their fundamental wavelength, light beams of 532 nm, 355 nm and 266 nm being its harmonic waves, may also be used.

However, there are light beams of specific wavelengths that have high transmittance through a glass and scarcely absorbed in the glass plate 10. For example, a light beam of emission wavelength 1,064 nm is scarcely absorbed in the glass plate 10. When a light beam of such a wavelength is used, it is necessary to set an irradiation target in the vicinity of a bubble for absorbing a light beam, and to concentrate the light beam on the irradiation target. As a method for forming such an irradiation target, for example, the vicinity 2 of a bubble 1 is irradiated with ultraviolet rays, γ rays or X rays to form a color center. Such a color center is a local structural defect formed in the glass plate 10 by irradiation of these light beams. The same type of local structural defects can also be formed by e.g. an irradiation of high-intensity pulse laser (pulse width is from 100 femtoseconds to 200 nanoseconds). Since such a pulse laser produces a high power per pulse, it is possible to produce extremely high peak power density in the vicinity of its focal point by condensing the pulse laser. When the peak power density is high, even if there is no light absorption of laser beam, a phenomenon called multi-photon absorption induces light absorption, which enables to apply a high energy to a glass in the vicinity of the focal point instantaneously.

By the effect of the energy, a local structural defect is formed in the glass.

Here, in the case of forming a color center, it is necessary to be careful not to affect visibility of the glass plate 10. The color center thus formed is subsequently irradiated with a concentrated laser beam and a glass in the color center and its vicinity are heated to at least the softening point. By this irradiation, the color center is disappeared. However, the color center is preferably small since the portion heated to at least the softening point can be thereby small.

For this reason, it is preferred to form a color center having a maximum diameter of at most 400 μm. Further, the portion of forming a color center is preferably in the vicinity 2 of bubble 1, namely, a portion satisfying the following formulas from the viewpoint of energy utilization:

$$0 \leq S \leq 2 \text{ mm (when } D \text{ is less than 4 mm)}$$

$$0 \leq S \leq 0.5D \text{ (when } D \text{ is at least 4 mm)}.$$

Here, S and D have the same definitions as described above.

In the method of the present invention, the intensity of a light source to be used, can be appropriately selected according to e.g. the size of bubbles existing in a glass plate, the thickness of the glass plate, the composition of a glass constituting the glass plate, or the type of light source to be used (lamp or laser light source, and, e.g. emission wavelength or emission type in the case of laser). In terms of the effect of reducing the maximum diameters of bubbles, the intensity of light source is preferably high.

However, when extremely high intensity light source is used, there is a possibility of adversely affecting the shape or optical characteristics of the glass plate. In a case of using a laser light source in the method of the present invention, it is preferred to use a laser light source having an average output of from 0.1 W to 100 W, more preferably from 0.5 W to 50 W, still more preferably from 1 W to 30 W. Here, preferred range of the intensity of light source changes depending on the type of laser light source. For example, in a case of $CO_2$ laser, since most of emission wavelength is absorbed in a glass, laser light is efficiently used for heating a glass. For this reason, it is preferred to use a laser light source having an average output of from 0.1 W to 50 W, more preferably from 0.5 W to 30 W, still more preferably from 1 W to 20 W. In a case of YAG laser or a $YVO_4$ laser, laser beam of a specific emission wavelength is scarcely absorbed in a glass, and thus, an irradiation target such as a color center needs to be formed in the vicinity of a bubble, and the laser beam is relatively inefficiently used for heating a glass. For this reason, it is preferred to use a laser light source having an average output of from 1 W to 100 W, more preferably from 2 W to 50 W, still more preferably from 5 W to 30 W.

In the case of laser light source, its emission principle is not particularly limited, and it may be a continuous emission beam (CW beam) or a pulsed emission beam. Further, in a case of using a laser light source of continuous beam, in order to prevent excessively raise the temperature of a portion of a glass plate irradiated with a laser beam, for example, the glass plate may be intermittently irradiated with the laser beam in such an irradiation cycle that the laser beam is irradiated for 0.1 second and stopped for 0.05 second.

Irradiation time of the laser beam can be appropriately selected according to the position or the size of a bubble or the glass composition of the glass plate. Further, irradiation of the laser beam may be carried out by a plurality of irradiations. For example, in a case of a bubble having a maximum diameter of a few mm, it is difficult to reduce the maximum diameter of the bubble by a single irradiation to at most a desired size, for example at most 400 μm. In such a case, irradiation may be made by a plurality of irradiations as its irradiation position is changed.

In the method of the present invention, since a glass plate is irradiated with a light beam emitted from a high-intensity light source, it is necessary to be careful about influence of the light beam irradiation on the glass plate. First of all, when a light beam in a wavelength region almost completely absorbed in a glass such as a $CO_2$ laser beam, most of a $CO_2$ laser beam is absorbed in the vicinity of a surface of the glass plate. As a result, the temperature in the vicinity of the surface of the glass plate rises. By the temperature rise, a glass in the vicinity of the surface expands, and a local bulge shape may be formed on the surface of glass plate. When a bulge shape is formed on the surface of glass plate, external appearance or optical characteristics of the glass plate may be adversely affected.

Secondly, in a portion of glass plate in which light beam is concentrated, change of density or change of network structure of a glass are caused. These changes may cause local residual stress or birefringence in the glass plate. When a local residual stress or birefringence is formed in the glass plate, the optical characteristics of the glass plate may be adversely affected.

Accordingly, at a time of carrying out the method of the present invention, it is necessary to select irradiation conditions (intensity, wavelength, irradiation time, irradiation position and the like of the light source) of the light beam so as to prevent or reduce occurrence of such problems as the above-mentioned bulge shape of a surface of glass plate or local residual stress or birefringence in a glass plate.

For example, change of density or change of network structure of glass in a portion in which light beam is concentrated, occurs since the temperature of the glass rapidly rises by irradiation of light beam and the temperature of the glass rapidly drops when the irradiation of light beam is completed, and thus, it is possible to prevent such a problem by gradually lowering the intensity of the light beam so as to prevent rapid temperature drop of the glass after the irradiation of light beam is completed.

Further, with respect to the bulge shape of a surface of glass plate, it is possible to prevent such a problem by selecting a position of irradiation of a light beam so that the bulge shape is formed at a position causing no problem in practical use. For example, in a case of using the glass plate as a glass substrate for a display, forming of a bulge shape is acceptable if the position correspond to an end portion that is enclosed in a casing, and in a case of using the glass plate as a photomask, forming of a bulge shape is acceptable if the position is on the backside of the photomask.

Further, the above-mentioned problems can be also solved by applying a post treatment. For example, a bulge shape formed on a surface of glass plate, can be removed by polishing the surface of glass plate. Meanwhile, change of density or change of network structure of glass in a portion where a light beam is concentrated, can be cleared by gradually heating in e.g. an electric furnace the glass plate after the irradiation of light beam, and gradually cooling the glass plate.

In the method of the present invention, the glass material constituting the glass plate is not particularly limited so long as its temperature can be raised to at least the softening point by irradiation of a light beam, and the maximum diameter of a bubble can be reduced by any one of the above-mentioned three principles when the temperature is raised to at least the softening point. Accordingly, the method of the present invention is applicable to almost all glass materials.

Since the method of the present invention reduces the maximum diameter of a bubble existing in a glass plate to a predetermined size, preferably 400 μm, the present invention can be widely applied to glass plates in an application where the visibility is important. Among these, glass plates in an application in which residual bubbles particularly affect visibility, specifically glass plates used as glass substrates for flat panel displays such as liquid crystal displays, plasma displays, organic EL displays or field emission displays, particularly glass plates to be used as glass substrates in a viewer side of such flat panel displays, are mentioned. Further, glass plates to be used as window glasses of transportation vehicles such as automobiles, trains, airplanes or ships, are mentioned. Further, glass plates for photomasks for which bubbles of at least a predetermined size form defects, are mentioned.

Here, these glass plates can be formed from a molten glass by using a float method, a fusion method or a downdraw method. Further, they may be obtained by redraw process of a primarily molded glass plate.

Further, the method of the present invention may be applied to a glass previously produced by a method by which bubbles become close to a circular shape (spherical shape). "The method by which bubbles become close to a circular shape" means a method of forming a molten glass ribbon in a state that whose viscosity is $\log_{10}\eta \leq 5$ into a plate thickness of from 1.0 to 1.5 times of a predetermined thickness t (0.3 to 1.1 mm), and further forming the molten glass in a state that its viscosity is $5 < \log_{10}\eta \leq 7$ into the predetermined thickness.

The above-mentioned method is specifically such that in a float plate glass production method, a molten glass ribbon in a state that its viscosity is $\log_{10}\eta \leqq 5$ is formed into a plate thickness of from 1.0 to 1.5 times of a predetermined thickness t (from 0.3 to 1.1 mm) by pulling the glass ribbon towards a layer (gradual cooling furnace) while the shrinking force of the molten glass ribbon floating on a molten metal produced by its surface tension is held at edge portions on both sides of the molten glass ribbon, and thereafter, subsequently pulling the molten glass ribbon in a state that its viscosity is $5 < \log_{10}\eta \leqq 7$ towards the layer while its edge portion on both ends are continuously held, to form the glass ribbon to have a plate thickness t.

EXAMPLES

From now, the present invention is further described with reference to Examples.

Example 1

Figure 2:
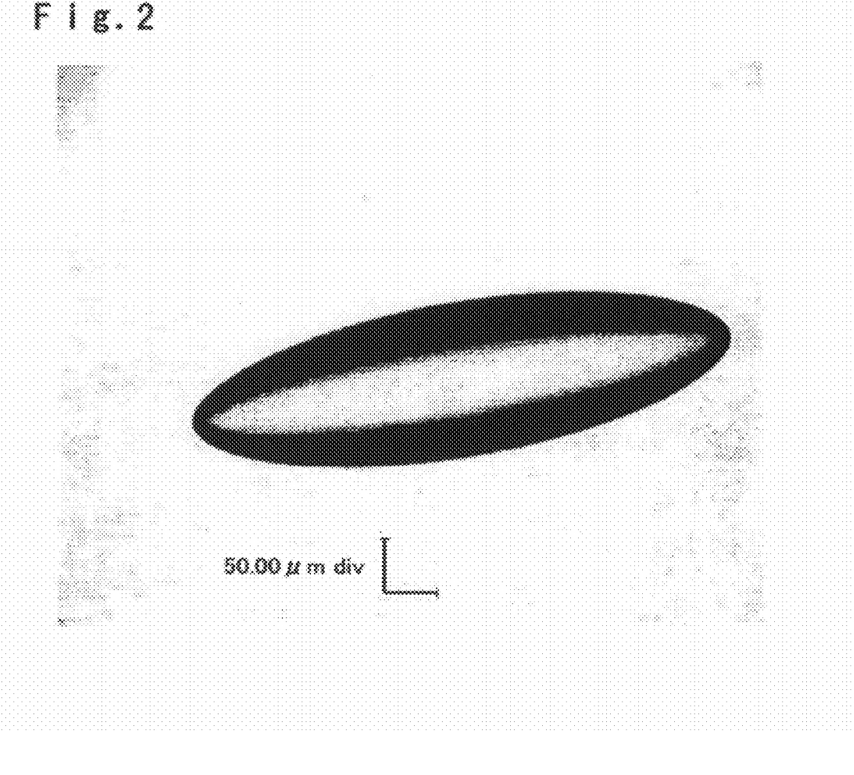
FIG. 2 is an optical micrograph (magnification 450×) of a bubble before irradiation of a $CO_2$ laser beam observed from a surface of the glass plate in Example 1.
Figure 3:
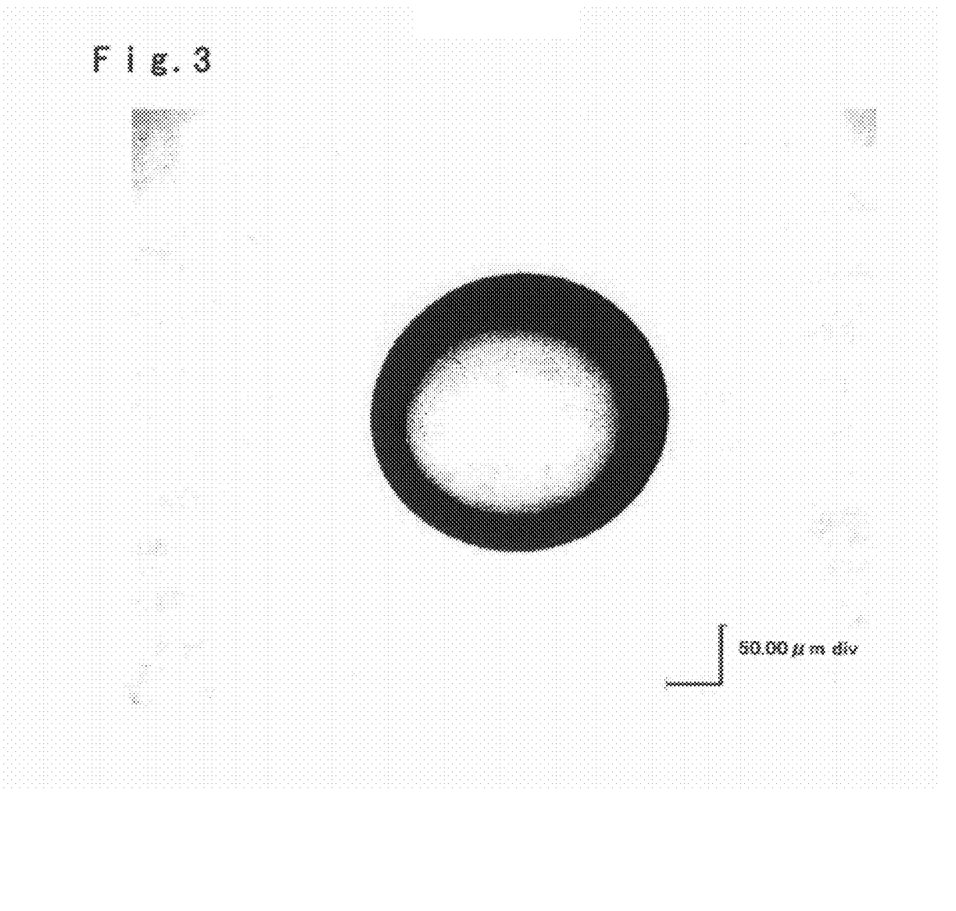
FIG. 3 is an optical micrograph (magnification 450×) of a bubble after irradiation of a $CO_2$ laser beam observed from a surface of the glass plate in Example 1.

A glass plate in which bubbles were existing was prepared. The glass plate was a glass substrate for liquid crystal display (product name AN100, manufactured by Asahi Glass Company, Limited, softening point is 950° C.) of 12 cm×12 cm, having a thickness of 0.5 mm. FIG. 2 is an optical micrograph of a bubble existing in the glass plate observed from a surface of the glass plate. The maximum diameter $d_1$ of the bubble is 514 µm, and $d_1/d_2=3.7$ (minor diameter $d_2$ of its elliptical shape was 140 µm). The vicinity of the bubble of the glass plate was irradiated with a laser beam emitted from a $CO_2$ laser light source so as to be concentrated thereon under the following conditions to make the temperature of glass in the vicinity of the bubble to be at least 950° C.
  Laser beam type: Continuous emission light (CW light)
  Maximum diameter of laser beam on a surface of glass plate: About 3 mm
  Average output: About 3 W
  Irradiation time: 30 seconds
  As a result, as shown in FIG. 3, the shape of the bubble changed from an elliptical shape to a spherical shape. The maximum diameter $d_1$ of the bubble shown in FIG. 3 was 267 µm and $d_1/d_2$ was 1.1 (the minor diameter $d_2$ was 236 µm). Accordingly, it was confirmed that the maximum diameter of the bubble was reduced by about 50% by the method of the present invention.

Example 2

Figure 4:
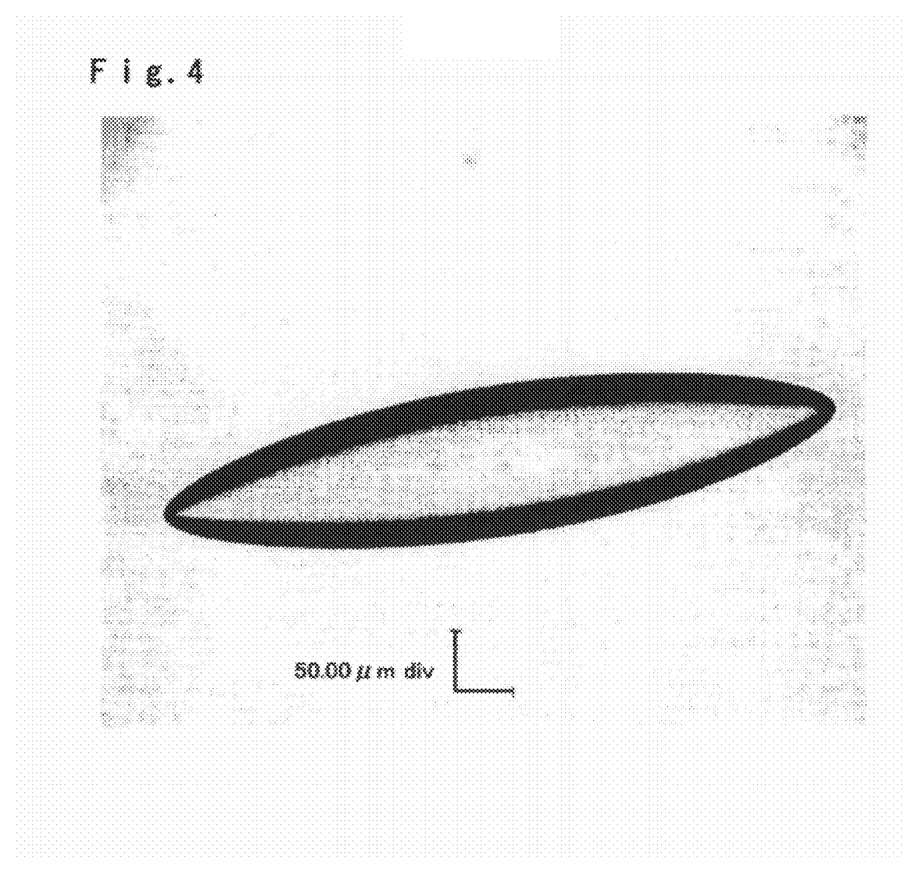
FIG. 4 is an optical micrograph (magnification 450×) of a bubble before irradiation of a $CO_2$ laser beam observed from a surface of the glass plate in Example 2.
Figure 5:
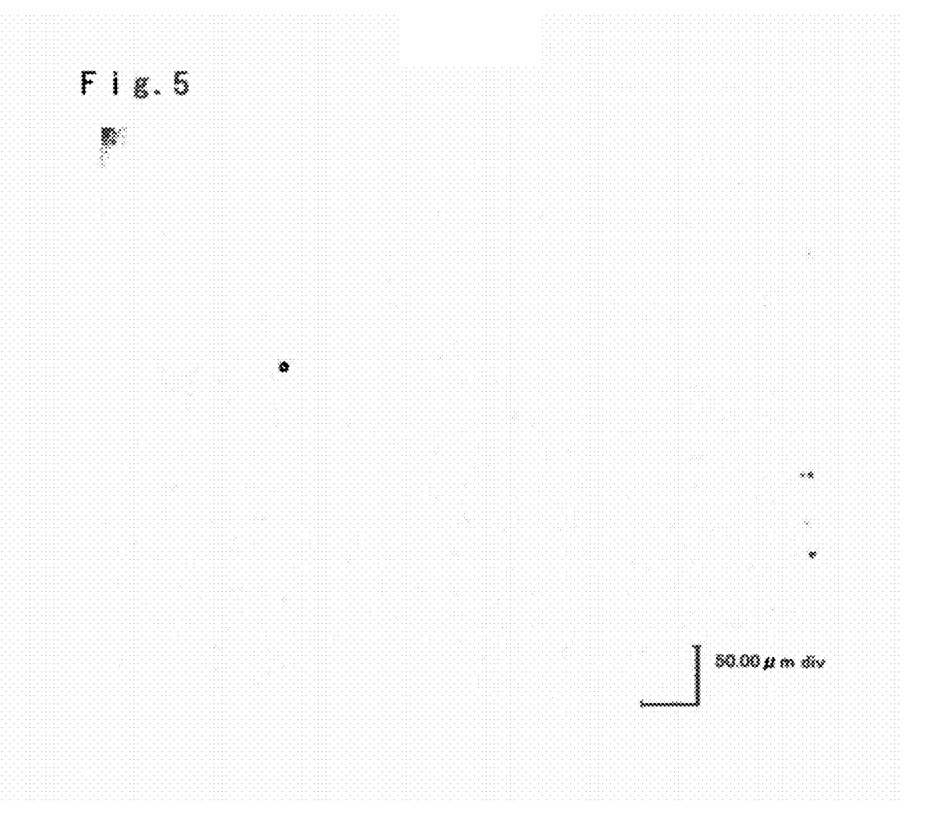
FIG. 5 is an optical micrograph (magnification 450×) of a bubble after irradiation of a $CO_2$ laser beam observed from a surface of the glass plate in Example 2.

A glass plate in which bubbles were existing was prepared. The glass plate was a glass substrate for liquid crystal display (product name AN100, manufactured by Asahi Glass Company, Limited, softening point 950° C.) of 12 cm×12 cm, having a thickness of 0.5 mm. FIG. 4 is an optical micrograph of a bubble existing in the glass plate observed from a surface of the glass plate. The maximum diameter $d_1$ of the bubble was 591 µm, and $d_1/d_2$ was 4.7 (the minor diameter $d_2$ of the elliptical shape was 127 µm). The vicinity of a bubble in the glass plate was irradiated with a laser beam emitted from a $CO_2$ laser light source so as to be concentrated thereon under the following conditions to make the temperature of glass in the vicinity of the bubble to be at least 950° C.
  Laser beam type: Continuous emission light (CW light)
  Maximum diameter of laser beam on a surface of glass plate: About 3 mm
  Average output: About 3 W
  Irradiation time: 30 seconds As a result, it was confirmed that the bubble in the glass plate was disappeared as shown in FIG. 5.

Example 3

Figure 6:
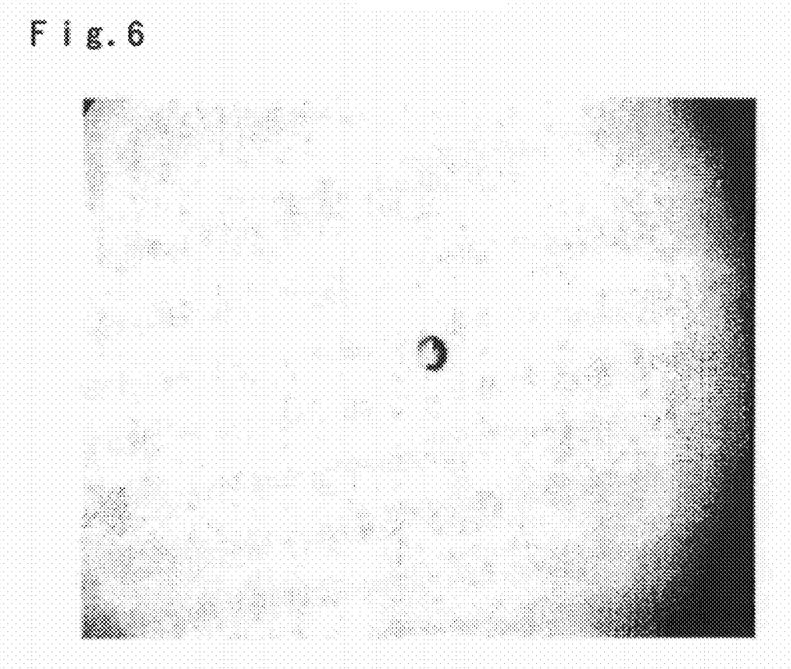
FIG. 6 is an optical micrograph (magnification 500×) of a bubble before irradiation of a $YVO_4$ laser beam observed from a surface of the glass plate in Example 3.
Figure 7:
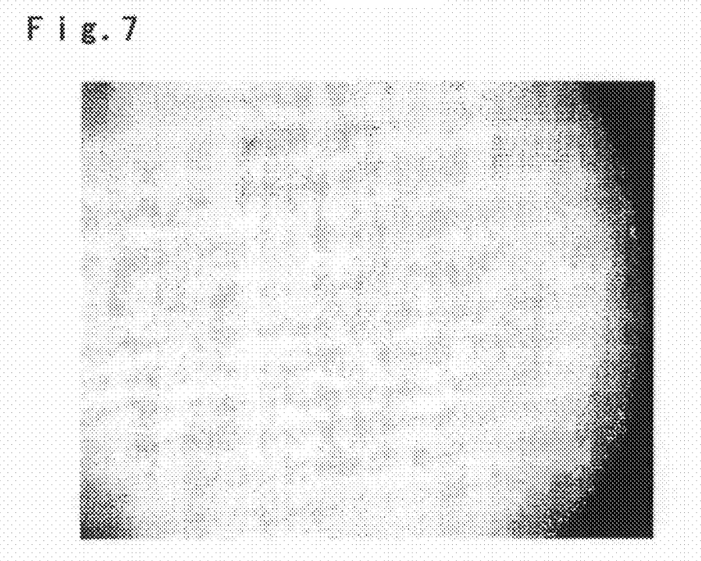
FIG. 7 is an optical micrograph (magnification 500×) of a bubble after irradiation of a $YVO_4$ laser beam observed from a surface of the glass plate in Example 3.

A glass plate in which bubbles were existing was prepared. The glass plate was a glass substrate for photomask (product name AS, manufactured by Asahi Glass Company, Limited, softening point 740° C.) of 5 cm×5 cm, is having a thickness of 5 mm. FIG. 6 is an optical micrograph of a bubble existing in the glass plate observed from a surface of the glass plate, and the bubble existing in the glass plate has a maximum diameter $d_1$ of 41 µm, and $d_1/d_2$ was 1.2 (the minor diameter $d_2$ of elliptical shape was 35 µm). The vicinity of the bubble in the glass plate was irradiated with a $YVO_4$ laser beam so as to be concentrated thereon as a high-intensity pulsed laser, to make the temperature of glass in the vicinity of the bubble to be at least 740° C. The irradiation conditions of the $YVO_4$ laser beam were specifically as follows.
  Wavelength: 432 nm
  Pulse width: 13 nanoseconds
  Laser beam type: Pulsed emission beam
  Repetitive frequency: 50 kHz
  Average output: 20 W
  Maximum diameter of laser beam on a surface of glass plate: 0.4 mm
  Irradiation time: 5 seconds
  After the irradiation of laser beam it was confirmed that the maximum diameter $d_1$ of the bubble was reduced to 20 µm or smaller as shown in FIG. 7.

Example 4

Figure 8:
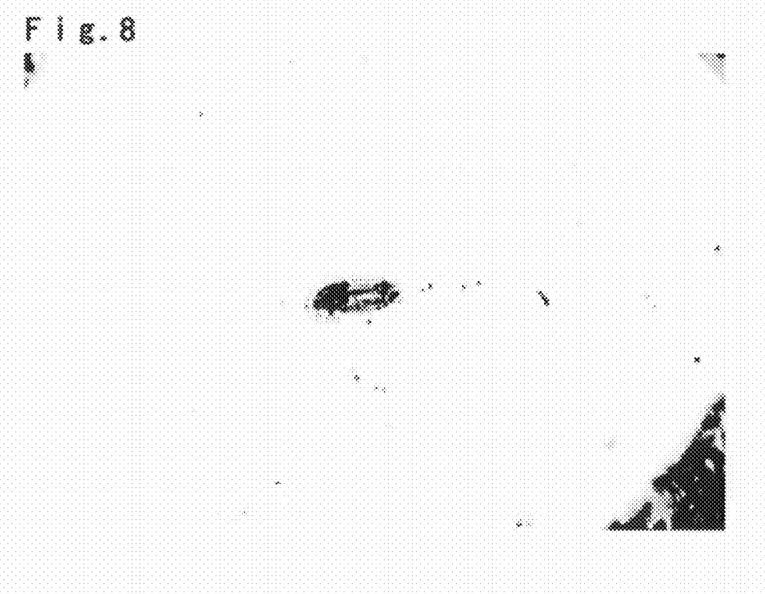
FIG. 8 is an optical micrograph (magnification 20×) of a bubble before irradiation of a $CO_2$ laser beam observed from a surface of the glass plate in Example 4.
Figure 9:
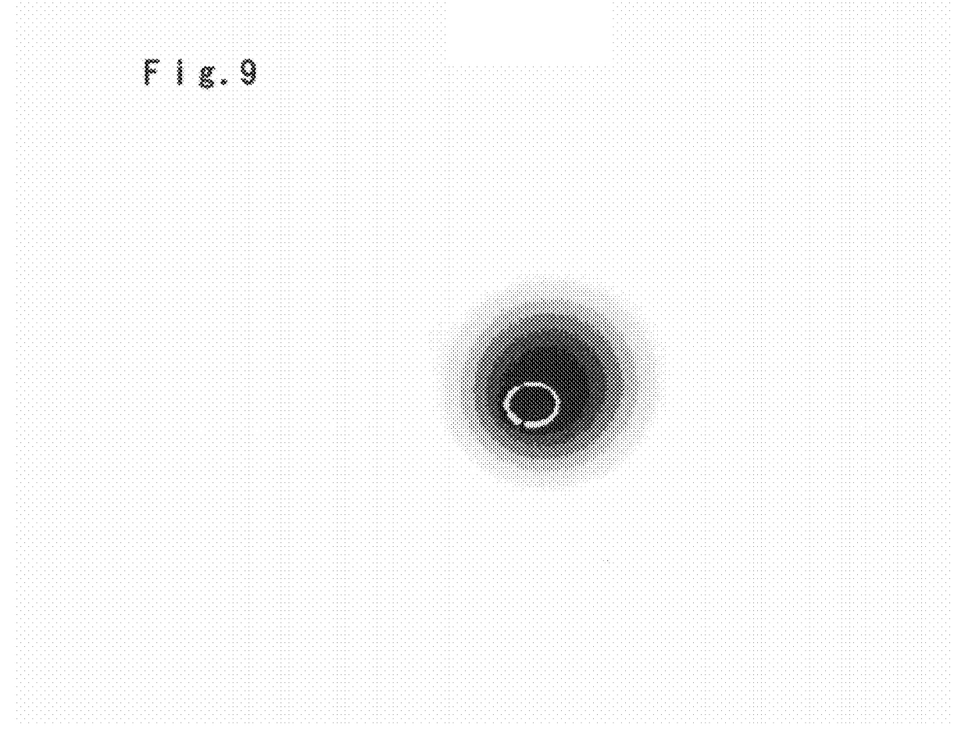
FIG. 9 is an optical micrograph (magnification 20×) of a bubble after irradiation of a $CO_2$ laser beam observed from a surface of the glass plate in Example 4.

A glass plate in which bubbles were existing was prepared. The glass plate was a glass substrate for plasma display (product name PD200, manufactured by Asahi Glass Company, Limited, softening point 830° C.) of 5 cm×5 cm, having a thickness of 2.8 mm. FIG. 8 is an optical micrograph of a bubble existing in the glass plate observed from a surface of the glass plate. The maximum diameter $d_1$ of the bubble was 630 µm, and $d_1/d_2$ was 2.3 (the minor diameter $d_2$ of elliptical shape was 280 µm). The vicinity of the bubble in the glass plate was irradiated with a laser beam emitted from a $CO_2$ laser light source so as to be concentrated thereon under the following conditions to make the temperature of glass in the vicinity of the bubble to be at lest 830° C.
  Laser beam type: Continuous emission beam (CW beam) was intermittently irradiated (irradiation time: 50 milliseconds, pause time: 50 milliseconds, repetitive frequency: 10 Hz)
  Maximum diameter of laser beam on a surface of glass plate: About 2 mm
  Average output: About 14 W
  Irradiation time: 40 seconds
  As a result, as shown in FIG. 9, the shape of the bubble was changed from an elliptical shape to a spherical shape. The maximum diameter $d_1$ of the bubble shown in FIG. 9 was 380 µm, $d_1/d_2$ was 1.0 (the minor diameter $d_2$ was 366 µm). Accordingly, it was confirmed that the maximum diameter of the bubble was reduced by about 40% by the method of the present invention.

INDUSTRIAL APPLICABILITY

The method of the present invention can be applied to glass plates, particularly glass substrates for displays, particularly glass substrates for flat panel displays or glass plates to be used as photomasks, and it is possible to reduce diameters of bubbles existing in the glass plates to a degree not preventing visibility of the glass plates.

The entire disclosure of Japanese Patent Application No. 2005-118193 filed on Apr. 15, 2005 including specification, claims, drawings and summary is incorporated herein by reference in its entirety.

What is claimed is:

1. A method for reducing a diameter of a bubble existing in a glass plate to be used as a glass substrate for a flat panel display, as window glasses of transportation vehicles, or as a photomask, comprising irradiating a vicinity of the bubble existing in the glass plate with a laser beam emitted from a laser light source, to raise a temperature of the glass in the vicinity of the bubble to at least a melting point of the glass to reduce a maximum diameter of the bubble, wherein the glass substrate is formed by a float method, a fusion method, a downdraw method, or by applying a redraw process to glass plate formed from a molten glass, wherein, prior to irradiating, the bubble is encapsulated by the glass plate and is under a surface of the glass plate, wherein before the irradiation of the laser beam, the bubble has an elliptical shape and $d_1$ and $d_2$ are perpendicular to one another and represent a major diameter and a minor diameter respectively of a shape of a bubble existing in the glass plate, wherein before the irradiation of the laser beam, at least 50% of bubbles existing in the glass plate satisfy formulas (1) and (2):

$$d_1 > 400 \mu m \quad (1)$$

$$d_1 > 2d_2 \quad (2)$$

wherein due to the irradiation of the laser beam, the shape of the bubble changes to a spherical shape, the bubble floats to the surface of the glass plate and substantially disappears, or glass in the vicinity of the bubble expands thereby reducing the volume of the bubble.

2. The method for reducing the diameter of a bubble existing in a glass plate according to claim 1, wherein the maximum diameter of the bubble existing in the glass sheet is at most 400 μm after irradiation of the light beam.

3. The method for reducing the diameter of a bubble existing in a glass plate according to claim 1, wherein the laser beam has a wavelength of from 0.1 to 11 μm, and a maximum diameter D of the laser beam on a surface of the glass plate is from 0.02 to 5 mm.

4. The method for reducing the diameter of a bubble existing in a glass plate according to claim 1, wherein the laser beam is a laser beam selected from the group consisting of a $CO_2$ laser beam, a YAG laser beam, a semiconductor laser beam, a rare earth material-doped fiber laser beam and a $YVO_4$ laser beam.

5. The method for reducing the diameter of a bubble existing in a glass plate according to claim 1, wherein the irradiation of the light beam is conducted so that when the maximum diameter D of the light beam on the surface of the glass plate is less than 4 mm, a minimum distance S from an interface between the bubble and the glass to an optical axis of the light beam, satisfies $0 \leq S \leq 2$ mm.

6. The method for reducing the diameter of a bubble existing in a glass plate according to claim 1, wherein the irradiation of the light beam is conducted so that when the maximum diameter D of the light beam on the surface of the glass plate is at least 4 mm, the minimum distance S from an interface between the bubble and the glass to the optical axis of the light beam, satisfies $0 \leq S \leq 0.5$ D.

7. The method for reducing the diameter of a bubble existing in a glass plate according to claim 1, wherein before the irradiation of the laser beam, at least 5% of bubbles existing in the glass plate satisfy formulas (3) and (4):

$$50 \mu m \leq d_1 400 \mu m \quad (3)$$

$$d_1 \leq 1.5 d_2 \quad (4)$$

wherein $d_1$ and $d_2$ are perpendicular to one another and represent the major diameter and the minor diameter respectively in the shape of a bubble existing in the glass plate.

8. The method for reducing the diameter of a bubble existing in a glass plate according to claim 1, wherein before the irradiation of the laser beam, a number of bubbles existing in the glass plate is $N_A$ and a number of bubbles satisfying the following formula (5) among the bubbles is $N_B$, and after the irradiation of the light beam, a number of bubbles existing in the glass plate is $N_C$ and a number of bubbles satisfying the following formula (5) among the bubbles is $N_D$, these numbers satisfy the following formula (6):

$$d_1 \leq 1.5 d_2 \quad (5)$$

$$N_B/N_A < N_D/N_C \quad (6)$$

wherein $d_1$ and $d_2$ are perpendicular to one another and represent the major diameter and the minor diameter respectively of the shape of a bubble existing in the glass plate.

9. The method for reducing the diameter of a bubble existing in a glass plate according to claim 1, wherein after the irradiation of the laser beam, the maximum diameter of a bubble existing in the glass plate is at most 20 μm.

10. The method for reducing the diameter of a bubble existing in a glass plate according to claim 1, wherein after the irradiation of the laser beam, the bubble in the glass plate substantially disappears.

11. The method for reducing the diameter of a bubble existing in a glass plate according to claim 1, wherein the glass plate is a flat panel display glass.

12. The method for reducing the diameter of a bubble existing in a glass plate according to claim 1, wherein the glass plate is a photomask.

* * * * *